N. C. BASSETT.
BLADE FASTENING.
APPLICATION FILED JULY 20, 1908.
915,710.
Patented Mar. 16, 1909.
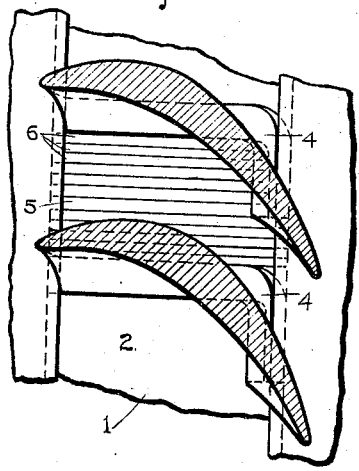
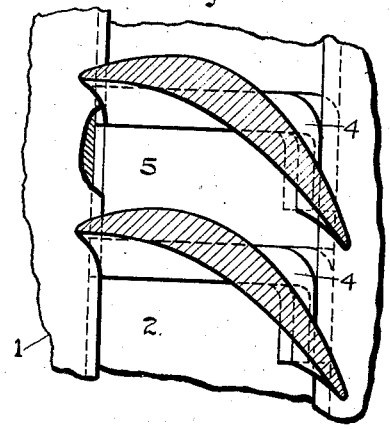
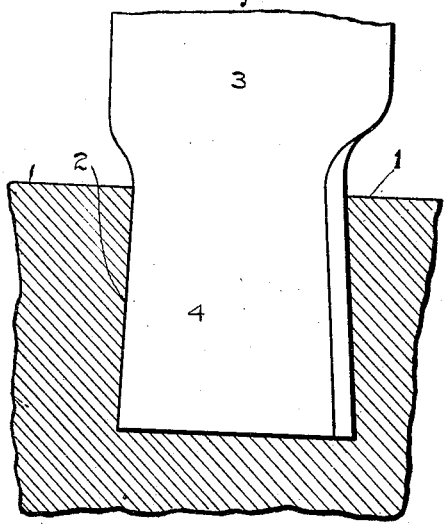
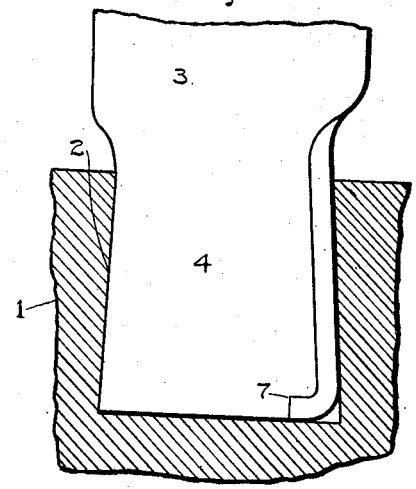
WITNESSES:
Ella Brickell
W. H. Lieber
N. C. Bassett INVENTOR
BY
G. F. Downing
ATTORNEY.

UNITED STATES PATENT OFFICE.

NORMAN C. BASSETT, OF MILWAUKEE, WISCONSIN, ASSIGNOR TO ALLIS-CHALMERS COMPANY, OF MILWAUKEE, WISCONSIN, A CORPORATION OF NEW JERSEY.

BLADE-FASTENING.

No. 915,710.  Specification of Letters Patent.  Patented March 16, 1909.

Application filed July 20, 1908. Serial No. 444,510.

*To all whom it may concern:*

Be it known that I, NORMAN C. BASSETT, a citizen of the United States, residing at Milwaukee, in the county of Milwaukee and State of Wisconsin, have invented a certain new and useful Improvement in Blade-Fastenings, of which the following is a specification.

This invention relates to a means of fastening the blades of any fluid propelled engine, or the blades of fans or rotary pumps for propelling a fluid, and has for its object to provide a fastening means capable of being used in any case where it is desired to firmly secure to some member a plurality of similar elements.

The term "blade" as used in these specifications and claims is not limited to any special form nor to those of any special machine, the form shown being used since it is one instance to which the invention is suitably adapted.

In the accompanying drawings which form a part of this specification, like figures which may appear in different views denote the same element.

Figure 1 is a plan view of a fragment of a blade-carrying element or base with the blades, which are shown in section, secured therein. Fig. 2 is an elevation of the device shown in Fig. 1, the blade-carrying element or base being in section. Fig. 3 is a plan view of a fragment of a modification of a blade-carrying element or base in which the blades are shown in section and secured therein. Fig. 4 is an elevation of the modification shown in Fig. 3 with the blade-carrying element or base shown in section.

The blade-carrying element 1 is provided with a groove or recess 2, the sides of which are tapered so as to make its cross-section of a dove-tail form as shown in Figs. 2 and 4. The blades 3 have a root or projection 4 at one end, adapted to fit the groove 2 and having an angular section as shown in Figs. 1 and 3. When the blades are in place, the angular section has one of its arms at an angle to the tapered sides of the groove 2, while the other arm is parallel to these sides and bears upon one of them. The portion of the groove 2 between the blades contains the distance pieces 5 which hold the blades at the proper distances from each other as well as holding them firmly in place. These distance pieces 5 are of such a shape that they fill the entire cavity in groove 2 between the blades and are shown of two types in the drawings. Figs. 1 and 2 show distance pieces 5 composed of separate strips or laminations 6, while Figs. 3 and 4 show same as a one piece.

In the construction as shown in Figs. 1 and 2 various materials might be used to make up the distance pieces since the strips 6 could easily be swung into position after the blade has been placed. As shown in Figs. 3 and 4, the distance pieces should be made of a calking material so that they could be pounded to fill every part of the groove.

As may be seen in Figs. 1 and 3, the distance pieces bear on both arms of the angular blade root so that they press the blade against one side of the groove of the blade-carrying element as well as against the distance piece on the opposite side of the blade. This insures a close fitting of the dove-tail shaped root of the blade within the dove-tail shaped groove 2 in the base 1.

If desired, the blade root 4 may be formed so that one arm of its angle has its lower edge 7 bent inwardly so as to form an angle or hook. When the distance piece is inserted, it will press this turned over lower edge or hook against the bottom of groove 2. This bent position or hook might be extended along the entire lower edge of the root of the blade, in which case an additional fastening or holding effect would be obtained.

From the foregoing description it will be seen that the invention embodies a very simple and efficient means of blade fastening.

It should be understood that it is not desired to be limited to the exact details of construction shown and described, for obvious modifications will occur to a person skilled in the art.

It is claimed and desired to secure by Letters Patent:

1. The combination of a grooved base, blades having roots located within said groove and extended entirely thereacross, and distance pieces between said blade roots, said roots having a portion of each located between a distance piece and a wall of said groove and having an opposite portion lying against another wall of said groove whereby said roots are both clamped and locked between said walls.

2. The combination of a grooved base, blades having roots located within said groove, and distance pieces between said blade roots, said roots having a portion of each located between a distance piece and a wall of said groove, and said roots formed each to lie in part between a distance piece and the bottom of said groove.

In testimony whereof, I affix my signature in the presence of two witnesses.

NORMAN C. BASSETT.

Witnesses:
  H. C. CASE,
  G. F. DE WEIN.